United States Patent
Kraft

(10) Patent No.: US 12,060,972 B2
(45) Date of Patent: Aug. 13, 2024

(54) WEARABLE HOLDER FOR AN ELECTRONIC DEVICE

(71) Applicant: Axel Kraft, Copenhagen K (DK)

(72) Inventor: Axel Kraft, Copenhagen K (DK)

( * ) Notice: Subject to any disclaimer, the term of this patent is extended or adjusted under 35 U.S.C. 154(b) by 0 days.

(21) Appl. No.: 17/525,103

(22) Filed: Nov. 12, 2021

(65) Prior Publication Data
US 2022/0146041 A1 May 12, 2022

(30) Foreign Application Priority Data
Nov. 12, 2020 (DK) .............................. PA202001272

(51) Int. Cl.
*F16M 13/04* (2006.01)
*A45F 5/00* (2006.01)

(52) U.S. Cl.
CPC .............. *F16M 13/04* (2013.01); *A45F 5/00* (2013.01); *A45F 2005/008* (2013.01); *A45F 2200/0525* (2013.01)

(58) Field of Classification Search
CPC .................. A47B 23/002; F16M 13/04; A45F 2200/0525; A45F 3/14; A45F 5/00; A45F 2005/008; A45C 2011/003
USPC ........................................................ 248/444
See application file for complete search history.

(56) References Cited

U.S. PATENT DOCUMENTS

| | | | | |
|---|---|---|---|---|
| 2,853,709 A * | 9/1958 | Peterson | ............ | A41D 13/0012 224/920 |
| 4,937,920 A * | 7/1990 | Tsai | .............. | G02C 3/003 24/442 |
| 5,136,759 A * | 8/1992 | Armour, II | .............. | A45F 3/14 24/442 |
| 5,163,591 A * | 11/1992 | Leiserson | .............. | A45F 5/021 224/663 |
| 5,263,423 A * | 11/1993 | Anderson | .............. | F16M 11/22 248/444 |
| 5,535,928 A * | 7/1996 | Herring | .............. | A45F 5/021 224/901 |
| 5,660,309 A * | 8/1997 | Belanger | .............. | A45F 3/14 224/257 |
| 5,713,548 A * | 2/1998 | Boyer | .............. | F16M 13/04 224/267 |
| 5,862,526 A * | 1/1999 | Longcor | .............. | A41F 9/002 2/253 |

(Continued)

FOREIGN PATENT DOCUMENTS

| | | | | |
|---|---|---|---|---|
| DE | 202016006354 U1 * | 2/2017 | ............. | A45C 13/30 |
| FR | 2981908 A1 * | 5/2013 | ........... | A45C 11/182 |

(Continued)

*Primary Examiner* — Taylor Morris

(57) ABSTRACT

A wearable holder for securely holding an electronic device, for example, a laptop is disclosed. The wearable holder is configured to enable the user for securely holding the electronic device on a person's body in a hand-free manner, thereby effectively utilizing the electronic device while avoiding droppings. The wearable holder comprises two straps having a respective first and second ends, at least two corner support holders, and a buckle clip. The corner support holders are securely sewn underside of both straps at spaced locations, wherein the two corner support holders are adapted to support the corners of the electronic device. The buckle clip is disposed at respective first ends of both straps for adjusting the straps.

1 Claim, 6 Drawing Sheets

(56) References Cited

U.S. PATENT DOCUMENTS

| | | | | |
|---|---|---|---|---|
| 6,083,183 A * | 7/2000 | Yang | A61F 5/028 | 2/311 |
| 6,106,016 A * | 8/2000 | Bette | A45F 5/02 | 248/51 |
| 6,202,236 B1 * | 3/2001 | Price | F41C 33/001 | 297/464 |
| 6,568,574 B2 * | 5/2003 | Jones | A45F 5/00 | 224/660 |
| 6,962,277 B2 * | 11/2005 | Quintana | A45F 3/14 | 709/201 |
| 7,051,910 B2 * | 5/2006 | Sprague | A45C 13/30 | 224/628 |
| 7,191,926 B1 * | 3/2007 | Costantino | A45C 3/02 | 224/616 |
| 7,360,649 B2 * | 4/2008 | Swaim | A47B 23/002 | 206/320 |
| 7,778,026 B2 * | 8/2010 | Mitchell | G06F 1/1628 | 224/648 |
| 7,780,049 B1 * | 8/2010 | Baranoski | A45F 3/14 | 248/323 |
| 8,616,423 B2 * | 12/2013 | Wizikowski | A45F 5/00 | 224/267 |
| 8,662,362 B1 * | 3/2014 | Bastian | H04B 1/385 | 248/205.2 |
| 8,844,448 B2 * | 9/2014 | Allen | A47B 23/002 | 108/43 |
| 8,979,605 B2 * | 3/2015 | Senn | B63C 9/155 | 441/92 |
| 8,998,052 B1 * | 4/2015 | Mitchell | A45F 3/14 | 224/660 |
| 9,302,606 B2 * | 4/2016 | Danze | B60P 7/0823 | |
| 9,375,073 B2 * | 6/2016 | Orr, Jr. | A45F 5/00 | |
| 9,433,279 B1 * | 9/2016 | Kemper | A45F 5/00 | |
| 9,538,852 B2 * | 1/2017 | Levy | A47B 23/002 | |
| 9,706,830 B1 * | 7/2017 | Prince | H04M 1/05 | |
| 10,021,957 B1 * | 7/2018 | Bryan | F16M 13/04 | |
| 10,362,883 B1 * | 7/2019 | Bellini | A45F 3/14 | |
| 10,772,411 B2 * | 9/2020 | Kippen | A45F 3/10 | |
| 11,089,877 B1 * | 8/2021 | Capra | A47C 7/383 | |
| 2004/0084494 A1 * | 5/2004 | Gilliam | A45F 5/00 | 224/661 |
| 2007/0210130 A1 * | 9/2007 | Bonnell | A45F 5/021 | 224/677 |
| 2008/0190974 A1 * | 8/2008 | Finn | A45F 5/00 | 224/267 |
| 2009/0219677 A1 * | 9/2009 | Mori | A45F 3/14 | 224/250 |
| 2009/0229497 A1 * | 9/2009 | Persico | F16M 13/00 | 108/43 |
| 2012/0024917 A1 * | 2/2012 | Case | A45F 5/00 | 224/259 |
| 2012/0037675 A1 * | 2/2012 | Shepherd | A45C 3/00 | 224/259 |
| 2012/0061549 A1 * | 3/2012 | Rogers | F16M 13/00 | 248/346.03 |
| 2012/0244767 A1 * | 9/2012 | Senn | B63C 9/155 | 224/191 |
| 2012/0325995 A1 * | 12/2012 | Balestrino | F16M 13/00 | 248/274.1 |
| 2013/0105662 A1 * | 5/2013 | Cote | F16M 13/04 | 248/689 |
| 2013/0277991 A1 * | 10/2013 | Wu | A45C 13/30 | 224/191 |
| 2014/0049060 A1 * | 2/2014 | Rayner | F16M 13/04 | 294/25 |
| 2015/0282599 A1 * | 10/2015 | Henry | F16M 13/00 | 224/242 |
| 2015/0283469 A1 * | 10/2015 | Barnes | F16M 13/022 | 446/369 |
| 2015/0354753 A1 * | 12/2015 | Courtwright | H04M 1/05 | 248/444 |
| 2016/0174692 A1 * | 6/2016 | Nash-Haynes | A45C 11/00 | 224/195 |
| 2016/0294431 A1 * | 10/2016 | Oney | A45F 5/00 | |
| 2018/0209584 A1 * | 7/2018 | Stutesman | F16M 11/041 | |
| 2019/0014888 A1 * | 1/2019 | Duncan | A45F 3/14 | |
| 2019/0298044 A1 * | 10/2019 | Frank | A45F 5/00 | |
| 2020/0178654 A1 * | 6/2020 | Razavi | A61B 5/02438 | |
| 2020/0205557 A1 * | 7/2020 | White, Jr. | A63C 17/0006 | |
| 2020/0229577 A1 * | 7/2020 | Jones | A45F 3/14 | |
| 2020/0288850 A1 * | 9/2020 | Gross | A45C 13/1069 | |
| 2020/0305581 A1 * | 10/2020 | Barklow | A41D 13/0007 | |
| 2022/0361651 A1 * | 11/2022 | Loukinova | A45F 5/00 | |

FOREIGN PATENT DOCUMENTS

| | | | | |
|---|---|---|---|---|
| KR | 200420963 Y1 * | 7/2006 | | F16M 11/32 |
| KR | 200435692 Y1 * | 2/2007 | | A45F 5/00 |
| KR | 20160004241 U * | 12/2016 | | A45F 5/00 |
| KR | 20170002121 U * | 6/2017 | | A45C 11/00 |
| TW | M513548 U * | 12/2015 | | A45F 5/00 |
| WO | WO-2015001500 A1 * | 1/2015 | | A45F 5/00 |
| WO | WO-2019038243 A1 * | 2/2019 | | A45C 13/30 |

* cited by examiner

WEARABLE HOLDER FOR AN ELECTRONIC DEVICE

CROSS-REFERENCE TO RELATED APPLICATION

This application claims priority to Danish Patent Application No. PA202001272, titled "WEARABLE HOLDER FOR AN ELECTRONIC DEVICE" filed on Nov. 12, 2020. The specification of the above referenced patent application is incorporated herein by reference in its entirety.

BACKGROUND OF THE INVENTION

A. Technical Field

The invention disclosed herein generally relates to a wearable holder. More particularly, the present invention relates to a wearable holder for securely holding an electronic device, for example, a laptop on a person's body in a hand-free manner, thereby effectively utilizing the electronic device while avoiding droppings and alleviating bad postures.

B. Description of Related Art

People and professionals from all fields in the business world accomplish their employment responsibilities utilizing electronic devices, for example, a computer and a laptop. Electronic devices such as laptop computers and similar portable electronic devices are often used at home and office environments by placing on their lap or a desk as a stand-alone device or in conjunction with a docking station.

However, users tensing their bodies in different positions in order to keep their electronic device, for example, a laptop, steady and secure from droppings or to maintain their body position. The electronic devices could be expensive, and prone to being dropped and damaged due to their sleek design. Most of the users are performing their tasks utilizing very poor postures for prolonged periods of time and are therefore exposing themselves to stress and long-term physical discomforts or injuries.

A prior art, US 2014/0289967 A1 of Levy et al., discloses a stabilizing apparatus for inclined legs comprises a thigh engageable portion extending generally transversally along the width of the lap of a subject with which the apparatus is bodily engaged, two spaced appendage portions extending downwardly from the thigh engageable portion, a foot engageable portion positionable on an underlying surface, and a portion, such a connecting element and tensioning device, extending from each of the two appendage portions to a foot engageable portion. However, above-mentioned prior art fails to design a flexible wearable holder for an electronic device, with at least two corner support holders, which are securely sewn underside of both straps at spaced locations.

In the light of above-mentioned problems, there is a need for a wearable holder to provide a hands-free and effort-free mounting solution for an electronic device, for example, a laptop. Further, there is also a need for a wearable holder for securely holding an electronic device, for example, a laptop on a person's body in a hand-free manner, thereby effectively utilizing the electronic device while avoiding droppings and alleviating bad postures.

SUMMARY OF THE INVENTION

The present invention discloses a wearable holder for securely holding an electronic device, for example, a laptop on a person's body in a hand-free manner, thereby effectively utilizing the electronic device while avoiding droppings and alleviating bad postures.

In one embodiment, the wearable holder is configured to enable the user for securely holding the electronic device, for example, a laptop on a person's body in a hand-free manner, thereby effectively utilizing the electronic device while avoiding droppings and alleviating bad postures. In one embodiment, the wearable holder could provide a hands-free and effort-free mounting solution for the electronic device, for example, a laptop. The user could securely hold the electronic device on the body in a hand-free manner.

In one embodiment, the wearable holder goes from above/outside to under the electronic device and continues further with the VELCRO® or hook and loop fastener down the inner thighs of the user. The tightening of the VELCRO® or hook and loop fastener will pull and hold the lower side of the electronic device, for example, a laptop.

In one embodiment, the wearable holder comprises at least two straps having a respective first end and a second end, at least two corner support holders, and a buckle clip. In one embodiment, the two corner support holders are securely sewn underside of both straps at spaced locations, wherein the two corner support holders are adapted to support the corners of the electronic device. In one embodiment, the buckle clip disposed at respective first ends of both straps for enabling the user to adjust the straps, thereby tightly holding the lower side of the electronic device.

In one embodiment, the wearable holder is configured to enable the user to secure and hold the lower side of the electronic device by adjusting the buckle clip at the respective first ends of both straps and passing the respective second ends over the user's limbs to securely support and hold the electronic device in a hand-free manner, thereby effectively utilizing the electronic device while avoiding droppings and alleviating bad postures.

In one embodiment, the second ends of the straps are adjustably secured to the user's limbs using VELCRO® or hook and loop fastener straps. In one embodiment, the VELCRO® or hook and loop fastener straps are securely sewn on as an extension on the second side ends of both straps. In one embodiment, the VELCRO® or hook and loop fastener straps are configured to enable the user to adjust the tightness, thereby pulling and securely holding the lower side of the electronic device onto the user's limbs.

In one embodiment, the two corner support holders are securely sewn to both straps at spaced locations on the shortest sides of both corner support holders. In one embodiment, the two corner support holders are made of a material includes, but not limited to, cotton, polyester, and a mix of a strong material, and the combination thereof. In one embodiment, the corner support holders are sewn on the underside of the straps for holding the electronic device, for example, a laptop, in tension.

In one embodiment, the first ends of both straps are securely inserted via holes of the buckle clip. The buckle clip allows the user to adjust the length and tightness of the straps when desired, and to automatically lock it to the chosen length. In one embodiment, the buckle clip could be an inch size regulation on the top of the mouse pad and could also be regulated to either side of the mouse pad of the electronic device, for example, a laptop.

Other objects, features and advantages of the present invention will become apparent from the following detailed description.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
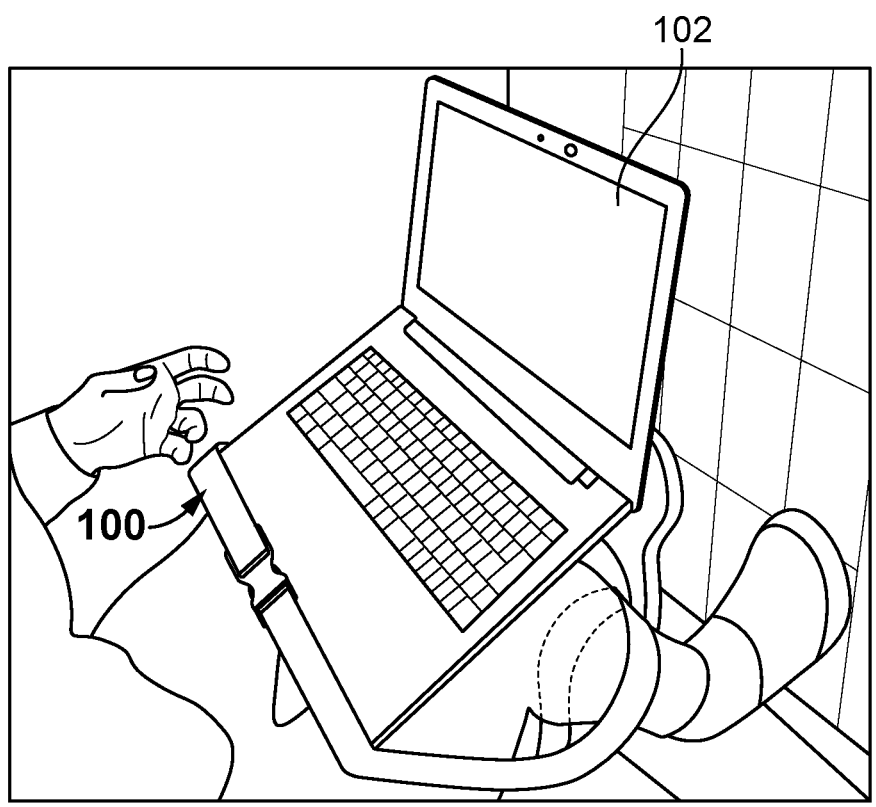
FIGS. 1-2 exemplarily illustrate perspective views of a wearable holder used by a user for securely holding an electronic device, for example, a laptop in an embodiment of the present invention.
Figure 2:
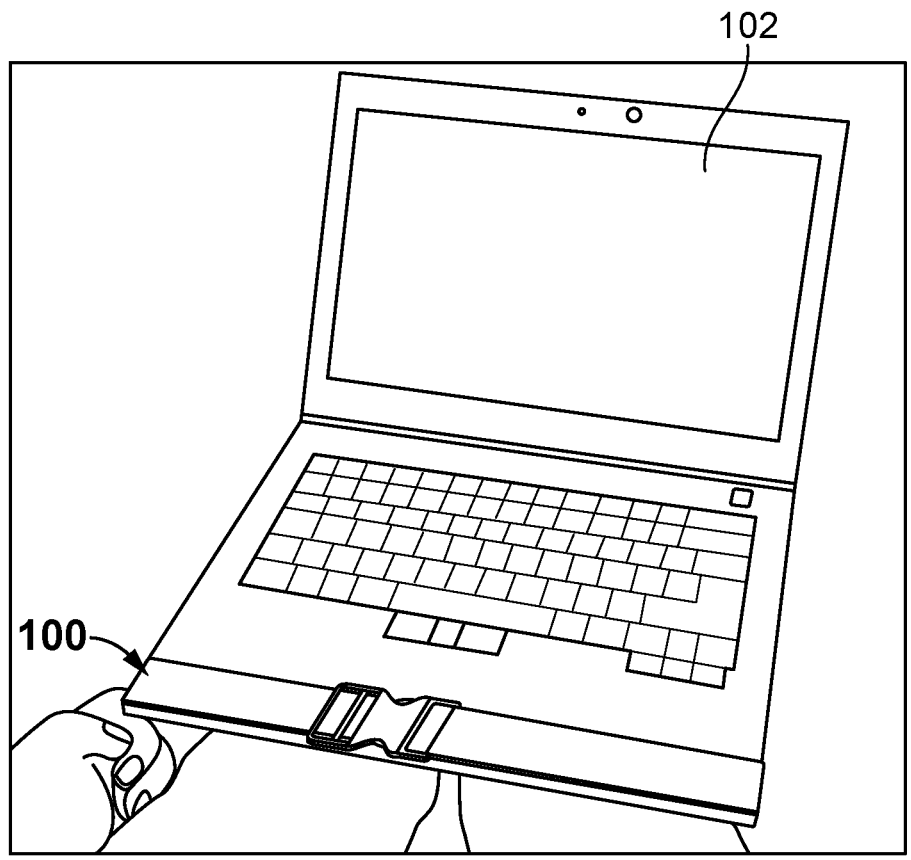

Referring to FIGS. 1-2, a wearable holder 100 used by a user 116 for securely holding an electronic device 102, for example, a laptop in one embodiment is disclosed. In one embodiment, the wearable holder 100 is configured to enable the user 116 for securely holding the electronic device 102, for example, a laptop on a person's body in a hand-free manner, thereby effectively utilizing the electronic device 102 while avoiding droppings and alleviating bad postures. In one embodiment, the wearable holder 100 could provide a hands-free and effort-free mounting solution for the electronic device 102, for example, a laptop. The user 116 could securely hold the electronic device 102 on the body in a hand-free manner.

Figure 3:
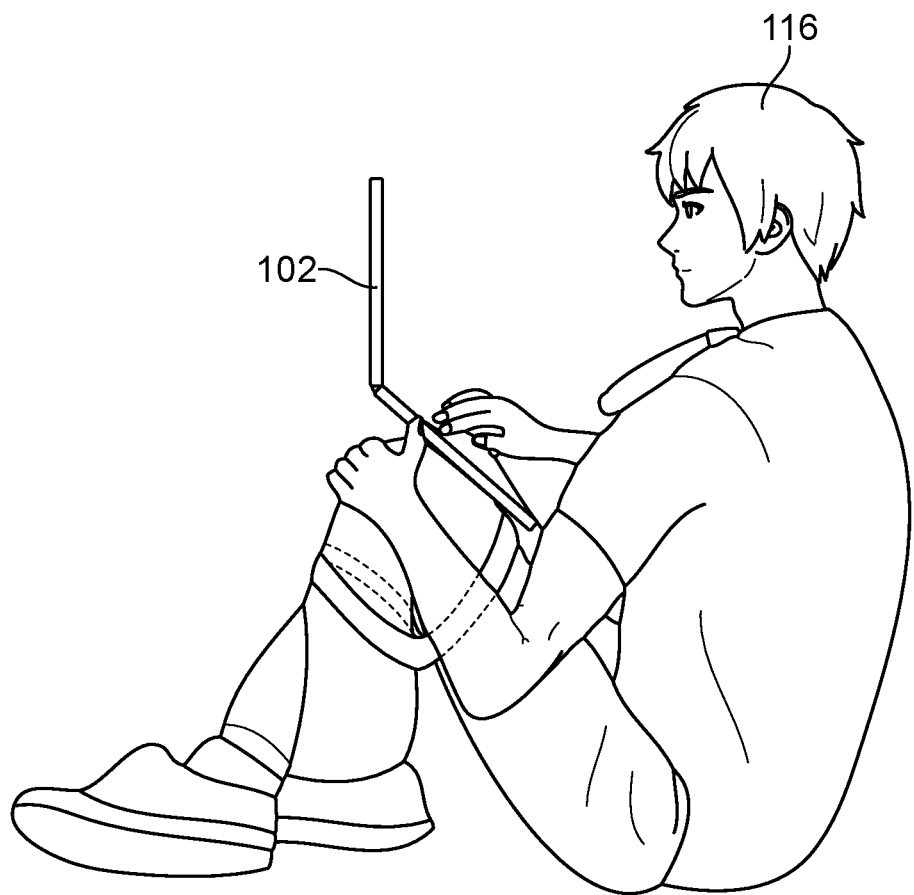
FIG. 3 exemplarily illustrates a perspective view of a user securely holds the electronic device, for example, a laptop using the wearable holder in one embodiment of the present invention.

Referring to FIG. 3, the user 116 securely holds the electronic device 102, for example, a laptop using the wearable holder 100 in one embodiment is disclosed. In one embodiment, the wearable holder 100 goes from above/outside to under the electronic device 102 and continues further with the VELCRO® or hook and loop fastener down the inner thighs of the user 116. The tightening of the VELCRO® or hook and loop fastener will pull and hold the lower side of the electronic device 102, for example, a laptop.

Figure 4:
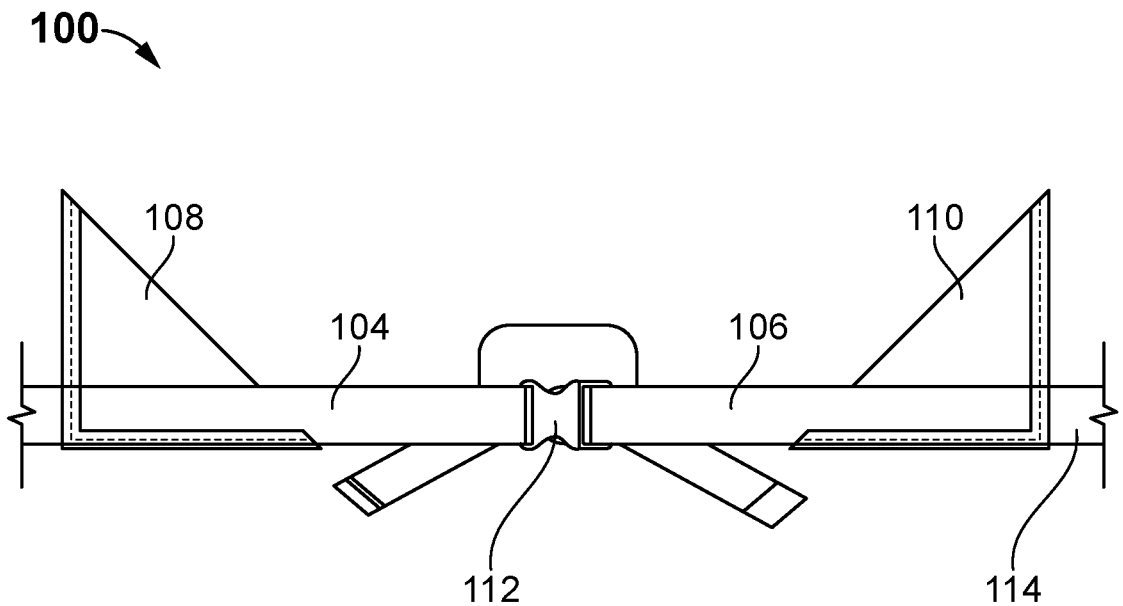
FIG. 4 exemplarily illustrates a top view of the wearable holder in one embodiment of the present invention.
Figure 5:
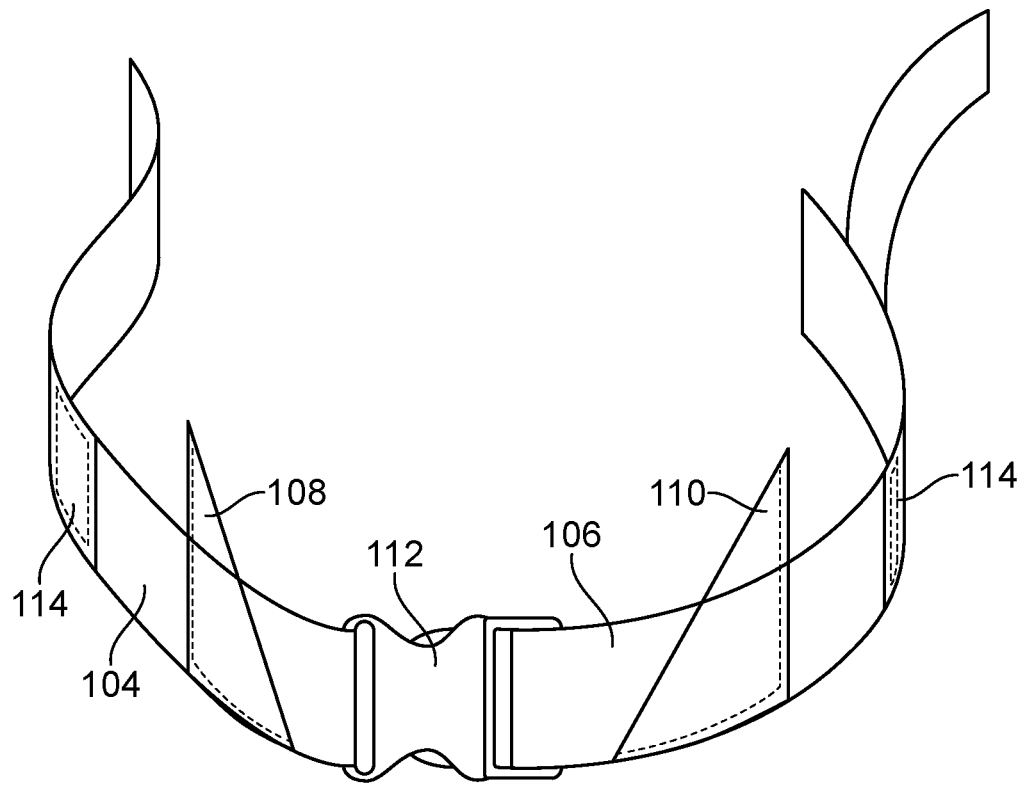
FIG. 5 exemplarily illustrates a perspective view of the wearable holder in one embodiment of the present invention.

Referring to FIGS. 4-5, the wearable holder 100 of the present invention in one embodiment is disclosed. In one embodiment, the wearable holder 100 comprises at least two straps (104 and 106) having a respective first end and a second end, at least two corner support holders (108 and 110), and a buckle clip 110. In one embodiment, the two corner support holders (108 and 110) are securely sewn underside of both straps (104 and 106) at spaced locations, wherein the two corner support holders (108 and 110) are adapted to support the corners of the electronic device 102. In one embodiment, the buckle clip 110 is disposed at respective first ends of both straps (104 and 106) for enabling the user 116 to adjust the straps (104 and 106), thereby tightly holding the lower side of the electronic device 102.

In one embodiment, the wearable holder 100 is configured to enable the user to secure and hold the lower side of the electronic device 102 by adjusting the buckle clip 110 at the respective first ends of both straps (104 and 106) and passing the respective second ends over the user's limbs to securely support and hold the electronic device 102 in a hand-free manner, thereby effectively utilizing the electronic device 102 while avoiding droppings and alleviating bad postures.

In one embodiment, the second ends of the straps (104 and 106) are adjustably secured to the user's limbs using VELCRO® or hook and loop fastener straps 114. In one embodiment, the VELCRO® or hook and loop fastener straps (114) are securely sewn on as an extension on the second side ends of both straps (104 and 106). In one embodiment, the VELCRO® or hook and loop fastener straps 114 are configured to enable the user 116 to adjust the tightness, thereby pulling and securely holding the lower side of the electronic device 102 onto the user's limbs.

Figure 6:
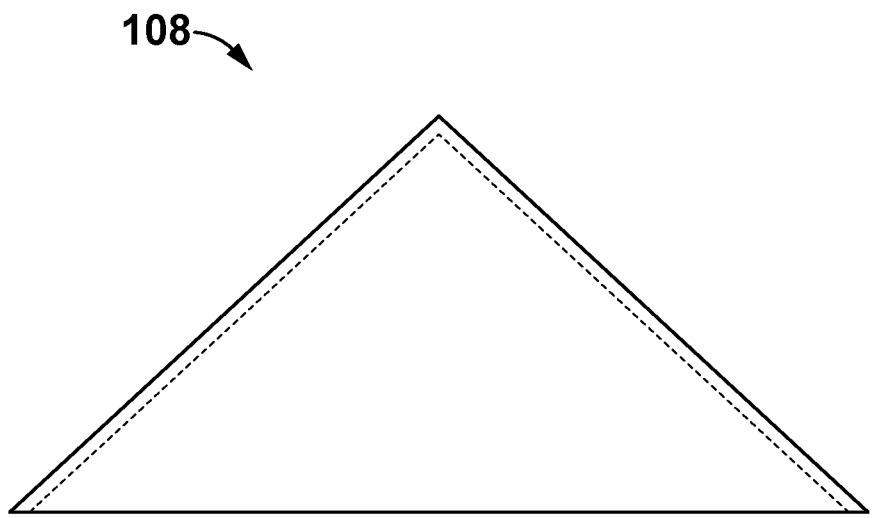
FIGS. 6-7 exemplarily illustrates a top view of two corner support holders of the wearable holder in one embodiment of the present invention.
Figure 7:
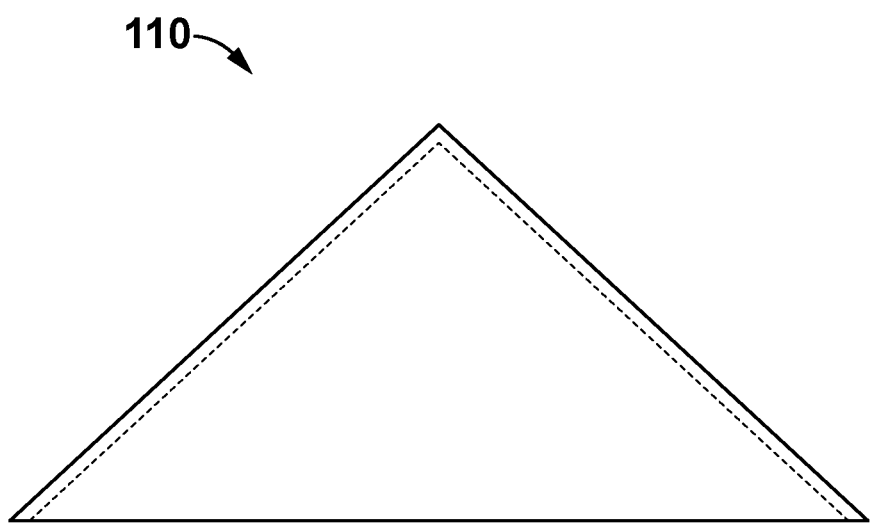

Referring to FIGS. 6-7, the two corner support holders (108 and 110) of the wearable holder 100 in one embodiment is disclosed. In one embodiment, the two corner support holders (108 and 110) are securely sewn to both straps (104 and 106) at spaced locations on the shortest sides of both corner support holders (108 and 110). In one embodiment, the two corner support holders (108 and 110) are made of a material includes, but not limited to, cotton, polyester, and a mix of a strong material, and the combination thereof. In one embodiment, the corner support holders (108 and 110) are sewn on the under side of the straps (104 and 106) for holding the electronic device 102, for example, a laptop, in tension.

Figure 8:
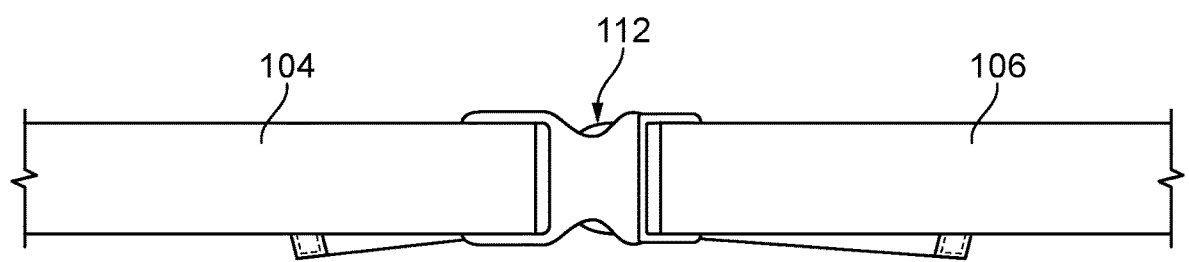
FIG. 8 exemplarily illustrates a top view of the first ends of both straps of the wearable holder respectively inserted into holes of the buckle clip in one embodiment of the present invention.

Referring to FIG. 8, the first ends of both straps (104 and 106) of the wearable holder 100 respectively inserted into holes of the buckle clip 112 in one embodiment is disclosed. In one embodiment, the first ends of both straps (104 and 106) are securely inserted via holes of the buckle clip 112. The buckle clip 112 allows the user 116 to adjust the length and tightness of the straps (104 and 106) when desired, and to automatically lock it to the chosen length. In one embodiment, the buckle clip 112 could be an inch size regulation on the top of the mouse pad and could also be regulated to either side of the mouse pad of the electronic device 102, for example, a laptop.

In one embodiment, the straps (104 and 106) could be a fabric square having the dimension of, but not 18×18 cm cut across and sewn together on the shortest sides of the both corner support holders (108 and 110). In one embodiment, 45 cm of nylon tape is sewn on the left side of the buckle clip 112 and 60 cm nylon tape is sewn on the right side of the buckle clip 112. A better model is created by having adjustment option on both sides of the buckle clip 112. The left and right corner support holders (108 and 110) are sewn on each side with the corners facing outwards and the corner support holders (108 and 110) are sewn on the underside/thigh sides of both straps (104 and 106). In one embodiment, the VELCRO® or hook and loop fastener straps 114 are sewn on as an extension on the left and right side ends of both strap (104 and 106) sides. The VELCRO® or hook and loop fastener straps 114 having the dimension of about, but not limited to, 50 cm.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims.

What is claimed is:

1. A wearable holder for an electronic device, consisting of:
    two straps having a respective first end and a second end;
    two corner support holders are adapted to support corners of the electronic device;
    a buckle clip disposed at respective first ends of both straps for enabling a user to adjust the straps for tightly holding a lower side of the electronic device,
    wherein the wearable holder is configured to enable the user to secure and hold the lower side of the electronic device by adjusting the buckle clip at the respective first ends of both straps and passing the respective second ends over a user's limbs to securely support and hold the electronic device in a hand-free manner, thereby helping a user to effectively utilize the electronic device while avoiding drops and alleviate bad posture, and wherein:
    the two corner support holders are securely sewn on a side of the straps facing the electronic device, at respective spaced locations on each strap.

* * * * *